E. H. W. WEIBULL.
ROLLER CAGE FOR ROLLER BEARINGS WITH CONVEX ROLLERS.
APPLICATION FILED SEPT. 8, 1919.
1,382,333. Patented June 21, 1921.
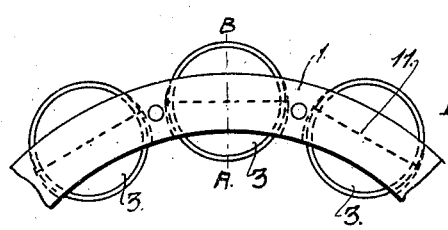
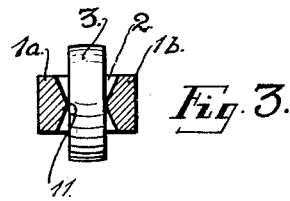
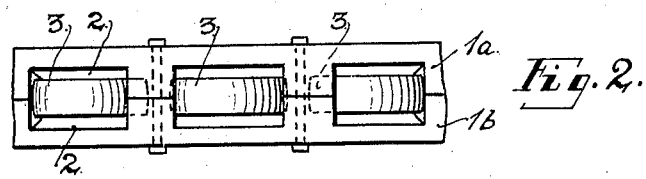
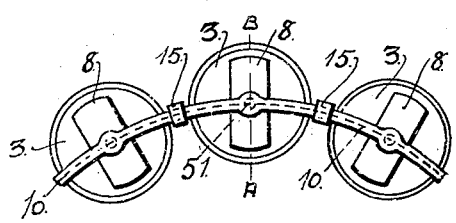
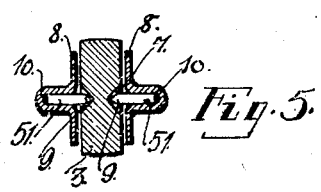
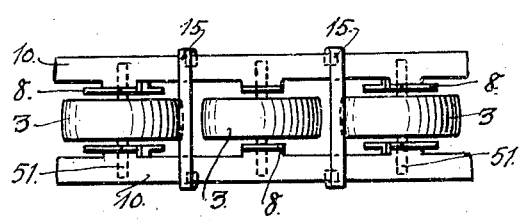
Inventor,
E. H. W. Weibull,
By H. R. Kerslake,
Attorney

UNITED STATES PATENT OFFICE.

ERNST HJALMAR WALODDI WEIBULL, OF GOTTENBORG, SWEDEN, ASSIGNOR TO NORDISKA KULLAGER AKTIEBOLAGET, OF GOTTENBORG, SWEDEN.

ROLLER-CAGE FOR ROLLER-BEARINGS WITH CONVEX ROLLERS.

1,382,333.     Specification of Letters Patent.     Patented June 21, 1921.

Application filed September 8, 1919. Serial No. 322,527.

*To all whom it may concern:*

Be it known that I, ERNST HJALMAR WALODDI WEIBULL, a subject of the King of Sweden, residing at Gottenborg, in the county of Gottenborg and Bohus, and Kingdom of Sweden, have invented new and useful Improvements in Roller-Cages for Roller-Bearings with Convex Rollers, of which the following is a specification.

This invention refers generally to roller bearings and more particularly to roller cages wherein the rollers are flattened on two opposite sides and formed with such a curvature, that the radius of the curvature to the producer is larger than the radius of the roller proper, that is to say such self-adjusting roller bearings, where the axis of rotation of the convex roller always tends to adjust itself in a proper parallelism to the geometrical axis of the bearing. If such a bearing should be exposed to an axial strain, the rollers will adjust themselves in a sloping position to the middle plane of the bearing in order, when the strain ceases, to return to the normal position, and accordingly a roller cage adapted to be used for such a bearing, must admit the said rocking motion without being overloaded.

The object of this invention is to provide a roller cage, of the class mentioned and consists principally of the provision of a roller cage having pivots supporting the rollers in such a way that the axes of rotation of the rollers may assume a sloping position relatively to the axis of the bearing in planes going through the axis of the bearing.

The invention is clearly illustrated in the accompanying drawings in which:—Figure 1 is a side view of a portion of a roller cage with its rollers mounted therein, Fig. 2 shows a horizontal view of the same portion, Fig. 3 shows a section of the roller cage on the line A—B in Fig. 1, Fig. 4 is a side view of a portion of a roller cage according to a third embodiment, Fig. 5 shows a section of the same cage on the line A—B in Fig. 4, and Fig. 6 shows a horizontal view of the parts in Fig. 4.

Referring to Figs. 1–3, 1 indicates a roller cage composed of two rings 1ª and 1ᵇ, provided with recesses 2 for the rollers 3 of the bearing, said rings being joined in such a way, that the recesses 2 are positioned opposite each other, thus forming a chamber for the respective rollers 3. The recesses 2, which terminate with cylindrical surfaces, have a diameter slightly larger than the diameter of the rollers proper and the cage is arranged in such a way, as to be suspended upon the rollers, when the row of rollers is mounted therein and applied into the bearing.

Further according to this embodiment of the invention the recesses 2 are widened on both sides of the bearing in radial direction above and beneath planes going through the centers of the rollers while edges 11 are formed in the cage on the axially opposite sides of the rollers, by means of which edges and enlarged recesses the rollers are able to obtain an oblique position relatively to a plane perpendicular to the axis of the bearing, simultaneously as the axes of rotation of the rollers are prevented from being displaced out of planes going through the central line of the axis of the bearing.

In Figs. 4 and 5 there is shown another embodiment of the invention, according to which the rollers 3 are provided with borings 4 centrally positioned and widening at both sides from the middle plane of the rollers.

Pins 5 pass through the borings 4, and are fixed to rings 6 provided on the sides of the row of rollers to support the rollers. On account of the double-conical shape of the borings 6 the rollers are able to obtain a sloping position relatively to the axis of the bearing, oscillating upon the pins 5.

In the embodiment according to Figs. 4 and 5 each of the rollers is provided with centrally located conical recesses 7 on its flattened sides while pivots 51 are journaled in the recesses and are attached to flexible rings 6 which are in turn provided along both sides of the row of rollers and having their flattened sides facing each other. Besides each pivot 51 is provided with a blade-shaped guiding spring 8, flexible and applied along the flattened sides of the rollers. As will be apparent the sloping of the rollers toward the axis of the bearing is made possible by means of the conical recesses coöperating with the conical ends 9 of the pivots 51 and the spring-action of the rings 6.

In Figs. 4, 5 and 6 there is illustrated a fourth embodiment of the invention with the rollers 3 provided with conical recesses 7. The roller cage here comprises two plate rings 10, located on the opposite flat sides of the rollers 3 with their broader surfaces parallel to the axis of the bearing and which plate rings are each provided with blade-shaped springs 8, applied with their flat sides facing the flat end sides of the rollers. Between the two rings 10 there are provided pivots 51 with conical points 9, which pivots coöperate with the conical recesses 7 in the rollers. The rings 10 are joined in a suitable manner for instance by means of cross brackets 15.

The embodiments shown are chosen merely as examples and I do not want to limit myself to these embodiments, but the details of the roller cage may be varied within the scope of this invention.

Having thus particularly described and ascertained the nature of the invention and in what manner the same is to be constructed what is claimed to be new is:—

1. In a roller bearing, a roller cage, convex rollers arranged in the cage and provided with opposed flattened sides, and supporting means on the cage coöperating therewith to allow the rollers to oscillate in a lateral direction relatively to a plane perpendicular to the axis of the bearing, so that the axis of rotation of the rollers may obtain a sloping position relatively to the axis of the bearing in planes passing through the center line of the axis of the bearing, when the race rings are in their normal concentric position relative to each other.

2. In a roller bearing, a roller cage, including spaced flexible rings, convex rollers arranged between the rings and provided with axially opposed flattened sides and having conical recesses formed centrally of such sides, conical pivots journaled in the recesses and blade-shaped springs attached to the pivots and with the pivots attached to the rings.

In testimony whereof I have affixed my signature.

ERNST HJALMAR WALODDI WEIBULL.